United States Patent
Kito et al.

[11] 3,796,467
[45] Mar. 12, 1974

[54] HYDRAULIC POWER BRAKE SYSTEM

[75] Inventors: Masahiro Kito, Nagoya; Atsumi Ueda, Toyota, both of Japan

[73] Assignee: Aisin Seiki Kabushiki Kaisha, Kariya, Japan

[22] Filed: Nov. 30, 1972

[21] Appl. No.: 310,853

[30] Foreign Application Priority Data
Dec. 4, 1971 Japan.............................. 46-98019

[52] U.S. Cl..................................... 303/13, 303/85
[51] Int. Cl............................................. B60t 13/14
[58] Field of Search ............... 303/2, 10, 11, 13, 52, 303/64, 84, 84 A, 85

[56] References Cited
UNITED STATES PATENTS

| | | | |
|---|---|---|---|
| 2,240,166 | 4/1941 | Stanley | 303/85 X |
| 3,107,126 | 10/1963 | Valentine | 303/85 X |
| 2,237,995 | 3/1966 | Dobrikin | 303/13 X |
| 3,278,242 | 10/1966 | Nakamura | 303/13 |
| 3,572,847 | 3/1971 | Luft | 303/13 |

*Primary Examiner*—Duane A. Reger
*Attorney, Agent, or Firm*—Oblon, Fisher, Spivak, McClelland & Maier

[57] ABSTRACT

The invention relates to a hydraulic power brake system, comprising, a reservoir having two tanks, the two tanks being fluidically communicated or separated from each other in accordance with a predetermined liquid level thereof, a first power source connected with one of the two tanks and being normally in the operating state, a second power source connected with the other tank and being normally in the non-operating state, a valve means actuating the second power source when the first power source is damaged, and a fluid actuating means being operated by either of both power sources and connected with the other tank.

5 Claims, 8 Drawing Figures

3,796,467

HYDRAULIC POWER BRAKE SYSTEM

BACKGROUND OF THE INVENTION

Field Of The Invention

The present invention relates generally to hydraulic systems and more particularly to hydraulic power brake systems especially adapted for use upon automotive vehicles.

SUMMARY OF THE INVENTION

One object of the present invention is to provide an improved hydraulic power brake system capable of operating a fluid actuating apparatus by one fluid power source even if another normally operating fluid power source is damaged.

Another object of the present invention is to provide an improved hydraulic power brake system capable of normally operating one fluid actuating apparatus by shutting off an inlet passageway leading to another fluid actuating apparatus when the other fluid actuating apparatus is damaged.

Still another object of the present invention is to provide an improved hydraulic power brake system capable of normally accumulating into one accumulator by shutting off an inlet passageway to the side of that accumulator when another accumulator is damaged.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

Figure 1:
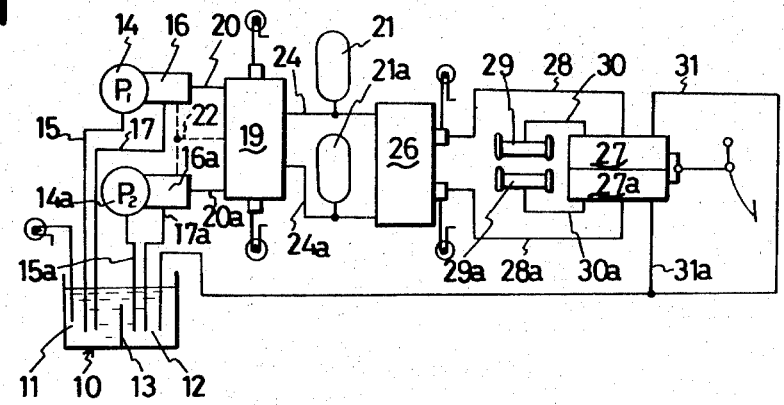
FIG. 1 is a schematic view, illustrating a first embodiment of the hydraulic system constructed according to this invention.
Figure 2:
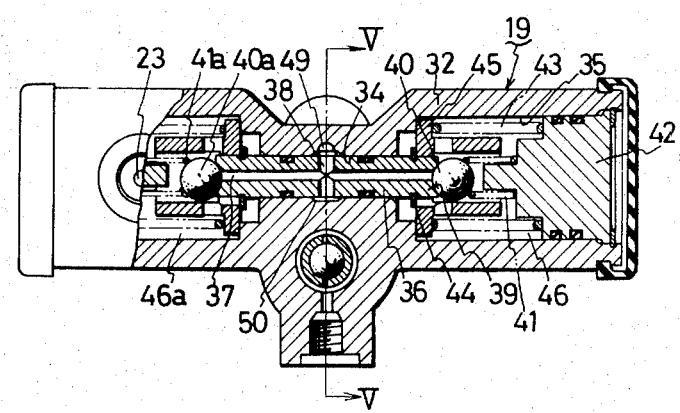
FIG. 2 is a sectional view of a first safety valve used in the system shown in FIG. 1.
Figure 3:
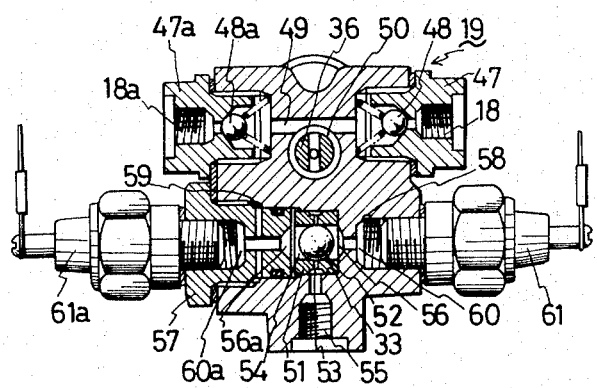
FIG. 3 is a view similar to that of FIG. 2 taken along the line V—V of FIG. 2.

Referring now to the drawings and more particularly to FIG. 1 thereof, one embodiment of the hydraulic system constructed according to the present invention includes a reservoir generally indicated by the reference character 10 which is divided into two tanks 11 and 12 by means of a partition wall 13. The height of the partition wall 13 is slightly less than the normal height of the liquid within both tanks 11 and 12 which are thus fluidically connected above the partition wall 13 in such normal state and are in turn separated from each other by the disposition of the liquid into the tanks 11 and 12 upon opposite sides of partition 13. The fluid of the tank 11 is fluidically supplied to a pump 14 via a suction pipe 15, a charging valve 16 being provided upon the pump 14. The charging valve 16 is provided with two outputs, one of them being fluidically connected with the tank 11 through a conduit 17 while the other is fluidically connected with a port 18 formed upon a first safety valve 19 through a pipe 20 as shown in FIGS. 2 and 3. Similarly, the fluid of the tank 12 is fluidically supplied to a pump 14a through a suction pipe 15a, a charging valve 16a being provided upon the pump 14a. The charging valve 16a is provided with two outputs, one of them being fluidically connected with the tank 12 through a conduit 17a while the other is fluidically connected with a port 18a formed upon the first safety valve 19 through a pipe 20a as shown in FIGS. 2 and 3.

Figure 4:
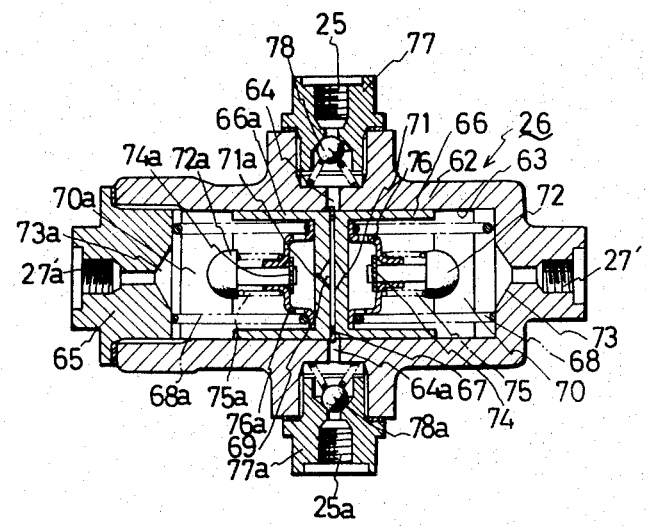
FIG. 4 is a view similar to that of FIG. 2, illustrating, however, a second safety valve which may be used in the system of FIG. 1.

Accumulators 21 and 21a, which contain hydraulic fluid under high pressure are fluidically connected to the charging valves 16 and 16a through the first safety valve 19 and a pilot pipe 22. A port 23 of the first safety valve 19 as shown in FIG. 2 is fluidically connected with the accumulator 21 through a conduit 24 while another port, not shown, is fluidically connected with the accumulator 21a through a conduit 24a. The accumulators 21 and 21a are further connected respectively with inlet ports 25 and 25a of a second safety valve 26 through the conduits 24 and 24a, as shown in FIG. 4. Outlet ports 27' and 27'a of the second safety valve 26 are fluidically connected with control valves 27 and 27a through conduits 28 and 28a, respectively, the control valves 27 and 27a being fluidically connected with wheel cylinders 29 and 29a through pipes 30 and 30a, respectively, and with the tank 12 by means of pipes 31 and 31a. The control valves 27 and 27a may be connected in a tandem style or in a parallel style. The pumps 14 and 14a and the accumulators 21 and 21a serve as power sources for the system.

Referring now to FIGS. 2 and 3, the control value generally indicated by the reference character 19 comprises a main body 32 having a first cylinder 33, a small diameter cylinder 34 provided upon the central portion of the main body 32 and located transversely of and above cylinder 33, and a pair of large diameter cylinders 35 provided upon opposite sides of the small diameter cylinder 34. A piston 36 is slidably disposed within the small diameter cylinder 34, a horizontal axial passageway 37 and a vertical, radial passageway 38 being provided within piston 36, while a pair of valve seats 39 are constructed upon both sides of the passageway 37. Two ball check valves 40 and 40a are respectively located upon the valve seats 39 so as to be normally seated through biasing springs 41 and 41a. One end of the spring 41 contacts the left side of plug 42 fixed and sealed within the large diameter cylinder 35 of the main body 32. The piston 36 is normally centered relative to cylinder 34 by means of a spring 43 acting through a snap ring 44 and a support block 45 so as not to move toward the left or right as viewed in FIG. 2, the other end of the spring 43 being contacted with the plug 42. The ports 23 are respectively communicated with two chambers 46 and 46a in which are housed springs 43.

Plugs 47 and 47a into which are threadingly secured the ports 18 and 18a, also include ball check valves 48 and 48a, as viewed in FIG. 3, ports 18 and 18a being fluidically connected with each other through a passageway 49, the passageway 49 in turn being communicated with an annular chamber 50 formed upon the center portion of the small diameter cylinder 34. An insert member 51 is frictionally secured within the cylinder 33 and a ball check valve 52 having a diameter slightly less than the inner diameter of the insert member 51 is inserted into the insert member 51. An annular, peripheral passageway 53 is provided upon insert member 51 and is fluidically connected at one end with a central chamber 54 in which ball valve 52 is disposed, and is connected at its other end with an outlet port 55 for the pilot pressure to the charging valve 16. Two valve seats 56 and 56a are disposed upon opposite sides of ball valve 52, valve seat 56 being located within the main body 32, while seat 56a is disposed within the right end of a plug 57 threadingly secured within the main body 32. Passageways 58 and 59 are connected with chambers 60 and 60a which are associated with the valve seats 56 and 56a, respectively, by means not shown. Similarly, two pressure switches 61 and 61a are respectively threadingly secured within the body 32 and plug 57 so as to be associated with chambers 60 and 60a.

Figure 5:
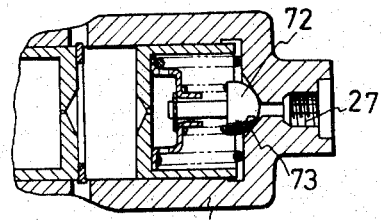
FIG. 5 is a horizontal sectional view looking downwardly, of the safety valve shown in FIG. 4.

Referring now to FIGS. 4 and 5, the second safety valve generally indicated by the reference character 26 also comprises a main body 62 having an axial cylinder 63 and radial passageways 64 and 64a being connected with the outlet ports 27' and 27a' and the inlet ports 25 and 25a respectively. The port 27a' is provided upon a plug 65 which is threadingly secured within one end of the main body 62. Two pistons 66 and 66a are opposedly arranged within the cylinder 63, there being a snap ring 67 interposed therebetween, and biasing springs 68 and 68a disposed within cylinder 63 so as to urge the pistons 66 and 66a toward each other. A central chamber 69, as well as side chambers 70 and 70a are defined by the pistons 66 and 66a and the main body 62 and the plug 65. Two orifices 71 and 71a within the opposed faces of the pistons 66 and 66a as well as apertures within guide plates 76 and 76a of pistons 66 and 66a are provided for communication between the chambers 69 and 70 and 70a. The pistons 66 and 66a have associated therewith valves 72 and 72a, and valve seats 73 and 73a provided within body 62 and plug 65, the valves 72 and 72a being held relative to pistons 66 and 66a by E-rings 74 and 74a and biasing springs 75 and 75a, the guide plates 76 and 76a being disposed between rings 74 and 74a and springs 75 and 75a at one end while being similarly disposed between springs 68 and 68a and the internal surfaces of the opposed faces of the pistons 66 and 66a. The guide plates 76 and 76a and the valves 72 and 72a are thus movable relative to one another. When the pistons 66 and 66a are moved toward the left or right, valves 72 and 72a are seated upon the seats 73 and 73a and the outlet ports 27' and 27'a are respectively opened or closed. Plugs 77 and 77a having check valves 78 and 78a at the inner portions thereof are threadingly secured within the main body 62 and serve to house inlet ports 25 and 25a.

The operation of the first embodiment will now be described in detail. When the system operates normally, the fluid is sucked from the tanks 11 and 12 of the reservoir 10 by means of the operation of the pumps 14 and 14a and the high pressure fluid is accumulated within the accumulators 21 and 21a through the first safety valve 19 via the charging valves 16 and 16a. In this case, for example, the charging valve 16 is a relief valve for relieving the system of excess pressure at a pressure of 150kg/cm² or an unloading valve which is actuated at a maximum pressure of 150kg/cm² and at a minimum pressure of 120kg/cm². Similarly, the charging valve 16a is an unloading valve which is actuated at a maximum pressure of 140 kg/cm² and at a minimum pressure of 110kg/cm², so the pump 14a normally creates the load operation. The fluid pressure accumulated within the accumulators 21 and 21a is transmitted to the control valve 27 and 27a through the second safety valve 26. The braking fluid pressure in accordance with the depression force of a brake pedal, not numbered, in thus transmitted to the wheel cylinders 29 and 29a by means of the control valves 27 and 27a which serve as fluid actuating means whereupon the braking operation is attained. By reducing the depression force of the brake pedal, the fluid pressure applied for accomplishing the braking operation through the return pipes 31 and 31a is returned to the tank 12 of the reservoir 10.

When the circuit including the control valve 27 is damaged the fluid pressure within the chamber 70 of the second safety valve 26 is less than that pressure within the chamber 69 whereby the piston 66 is moved toward the right by the pressure differential between the chambers 69 and 70, and the valve 72 is contacted with the seat 73, so that the fluid pressure is not supplied to the outlet port 27'. In this state the fluid pressure of the accumulator acts upon the valve 72 with its sealing sectional area, the force acting upon the valve 72 being larger than that of the spring 68 so that the valve 72 maintains the closed state whereby the locking function is attained.

Subsequently, when the pipe 30 or the wheel cylinder 29 fails and is fluidically deficient, the quantity of the fluid pressure from the damaged portion becomes much less than that of the fluid pressure from the orifice 71, and the fluid pressure within the chamber 70 is also much less than that of the chamber 69 so that the abovementioned operation is attained. In addition to the abovementioned operation, when the circuit of the pipe 28 is damaged the same aforementioned operation is achieved.

The valves 72 and 72a may be secured to the pistons 66 and 66a by means of the springs 75, but in lieu of springs 75, the valves 72 may be fixed directly to the pistons 66 and 66a so that the valves move relative to the seats 73, so as to seal the same.

When the pipe 24 and the accumulator 21, or the pipe 24a and the accumulator 21a, fail the fluid pressure within the chamber 46 is much lower than that of the chamber 46a and so the piston 36 is moved toward the right by means of the pressure differential between the two chambers 46 and 46a as seen in FIG. 2 and the ball valve 40 contacts the plug 42. Accordingly, the flow of fluid pressure from the pump 14 into the chamber 46 through the passageways 38 and 37 is obstructed and the fluid pressure is capable of being transmitted only to the normal unfailed pipe 24a and the accumulator 21a by means of pump 14a.

Another operation of the first safety valve 19 will now be described in detail. The fluid forwarded from both pumps 14 and 14a flows into the first safety valve 19 through the ports 18 and 18a and past check valves 48 and 48a so that the fluid discharged from the pump 14 or 14a from the normal side does not flow backward into the pump 14a or 14, to the damaged side even when one system of the pump is damaged.

When the pressure force between the accumulators 21 and 21a is different from each other the higher pressure force operates the ball check valve 52 under the pilot pressure and the flow of fluid from the high pressured accumulator to the low pressured accumulator is prevented. The pressure switches 61 and 61a are operated and issue a signal when the pressure differential of the accumulators is perceived and the appropriate, respective pressure thereof is decreased under the prevailing pressure.

When either the pipe 20 or the charging valve is damaged the pressure of the pump 14 is not increased and so fluid pressure leakage is present. Accordingly, the fluid pressure of the tank 11 of the reservoir 10 is reduced, but the fluid pressure of the tank 12 thereof remains the same so that the pump 14a operates normally. The pump 14a is always operated in its unloaded state so long as the pump 14 is operated normally, and in this way, the service life of the pipe 20 or the charging valve 16a is exceedingly good.

Figure 6:
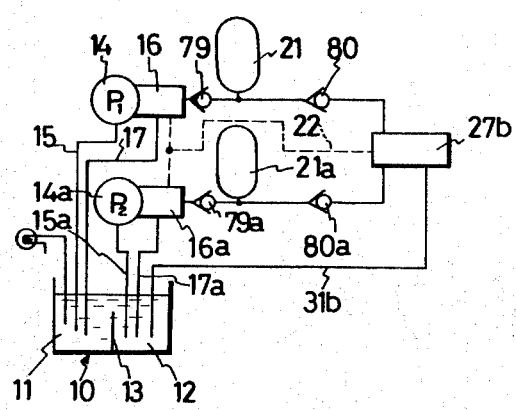
FIG. 6 is a view similar to that of FIG. 1, illustrating, however, a second embodiment of the hydraulic system constructed according to this invention.

In FIG. 6, there is shown another embodiment of the present invention, which embodiment is almost identical in construction to the first embodiment shown in FIG. 1 except that the first and second safety valves 19 and 26 in FIG. 1 have been removed and one-way valves 79 and 79a are disposed between the charging valves 16 and 16a and the accumulators 21 and 21a, respectively, and further, one-way valves 80 and 80a are disposed between the accumulators 21 and 21a and a closed center actuator 27b.

When the system in FIG. 6 is normally actuated the fluid passing from the tank 11 by normally operating pump 14 is accumulated in the side of the accumulator 21, and the accumulated fluid is transmitted to the closed center actuator 27b. Therefore, the braking pressure in accordance with the depression force of the brake pedal, not shown, through the actuator 27b is transmitted to the wheel cylinders 29 and 29a and the braking operation is accomplished. The fluid returned from the actuator 27b is transmitted to the tank 12. Consequently, in this state both tanks 11 and 12 are communicated each other.

When however, the pump 14 or the accumulator 21 is damaged, the charging valve 16a is brought into the operating state by the pilot pressure from the closed center actuator 27b and the discharged fluid from the pump 14a is accumulated into the accumulator 21a, and so the same operation as the abovementioned normal state is attained. Accordingly, in this state, only the tank 12 is effectively operable.

Figure 7:
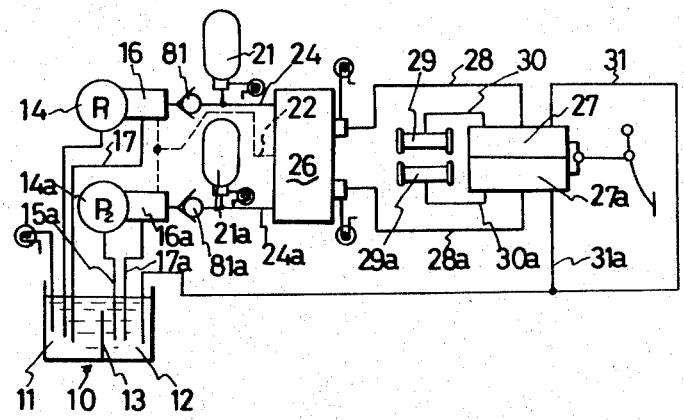
FIG. 7 is a view similar to that of FIG. 1, illustrating however, a third embodiment of the hydraulic system constructed according to this invention.

In FIG. 7, there is shown still another embodiment of the present invention which embodiment is almost identical in construction of the first embodiment of FIG. 1 except that the first safety valve 19 has been removed and in lieu thereof, one-way valves 81 and 81a are inserted between the charging valves 16 and 16a and the accumulators 21 and 21a, and further the pilot pressure for the charging valves 16 and 16a is led from the second safety valve 26 through the pipe 22. In operation, as the pipe 24 or the accumulator 21 or the pipe 24a or the accumulator 21a in FIG. 1 has been deleted from the system of FIG. 7, the same operation in the damaged state of either of the pipe 20 and the charging valve 16 of the system of FIG. 1 is attained in the damaged state of the pipe 24 or the accumulator 21, or the pipe 24a or the accumulator 21a within the system of FIG. 7. Similarly, the operation in the damaged state of the circuit of the control valve 27 or the pipe 30 or the wheel cylinder 29 is accomplished in the system of FIG. 7 as was accomplished in the system of FIG. 1.

Figure 8:
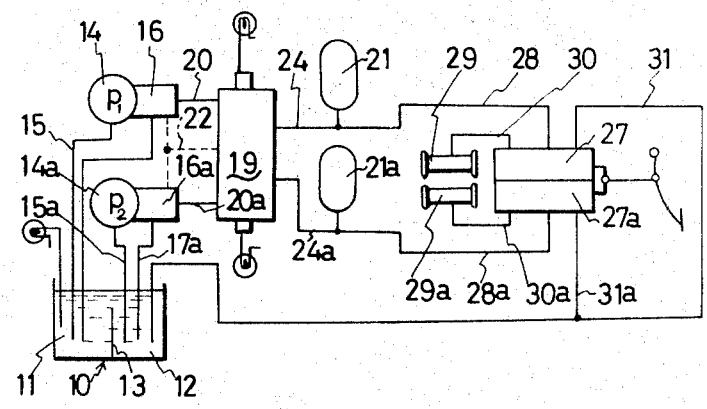
FIG. 8 is a view similar to that of FIG. 1, illustrating however, a fourth embodiment of the hydraulic system constructed according to this invention.

Referring now to FIG. 8, there is shown a further embodiment of the present invention, which embodiment is almost identical in construction to the first embodiment of FIG. 1 except that the second safety valve 26 has been removed. In operation, if either of the pipe 20 or the charging valve 16 is damaged, the same operation is attained with the system shown in FIG. 8 as that system of FIG. 1. When the circuit of either of the accumulators 21 and 21a is damaged, the outlet port of the damaged side of the first safety valve 19 is closed.

Obviously many variations and modifications of the present invention are possible in light of the above teachings. It is to be understood, therefore, that within the scope of the appended claims, the invention may be practiced otherwise than as specifically described herein.

What is claimed as new and desired to be secured by Letters Patent of the United States is:

1. A hydraulic power brake system comprising:
    a reservoir having two tanks, said two tanks being fluidically communicated when the liquid level of said two tanks exceeds a predetermined value and being separated from each other when said liquid level is lower than said predetermined value;
    a first power source connected with one of said tanks and being normally in the operating state;
    a second power source connected with the other of said tanks and being normally in the non-operating state;
    a valve means actuating said second power source when said first power source is damaged; and
    a fluid actuating means being operated by either of said power sources and connected with said other tank.

2. The hydraulic power brake system as claimed in claim 1, wherein there is further provided at least two fluid actuating means, said first and second power sources including pump means and accumulator means respectively connected to said two fluid actuating means, said first and second power sources being accumulated into said accumulators by one of said pump means in the normal operating state.

3. The hydraulic power brake system as claimed in claim 2, wherein there is further provided a first control valve means for cutting off an inlet passageway of one of said accumulator means when one of said accumulators is damaged and for permitting the accumulation of fluid into said accumulators by actuating the other one of said pump means when said one normally operating pump is damaged.

4. The hydraulic power brake system as claimed in claim 1, wherein there is further provided at least two fluid actuating means operatively connected with said first and second power sources and operable by either of said first and second power sources in a normal operating state.

5. The hydraulic power brake system as claimed in claim 4, wherein there is further provided a second control valve means for cutting off an inlet passageway leading to one of said fluid actuating means when said one of said fluid actuating means is damaged and for connecting one of said first and second power sources with both of said fluid actuating means by actuating one of said first and second power sources when the other of said first and second power sources is damaged.

* * * * *